(12) United States Patent
Woo

(10) Patent No.: US 8,199,699 B2
(45) Date of Patent: Jun. 12, 2012

(54) LEGACY SUPPORT FOR WI-FI PROTECTED SETUP

(75) Inventor: James Woo, Los Altos, CA (US)

(73) Assignee: Ricoh Company, Ltd., Tokyo (JP)

( * ) Notice: Subject to any disclaimer, the term of this patent is extended or adjusted under 35 U.S.C. 154(b) by 672 days.

(21) Appl. No.: 11/925,469

(22) Filed: Oct. 26, 2007

(65) Prior Publication Data

US 2009/0109897 A1    Apr. 30, 2009

(51) Int. Cl.
*H04W 4/00*    (2009.01)
*H04M 1/66*    (2006.01)
(52) U.S. Cl. ........................................ 370/328; 370/254
(58) Field of Classification Search .................. None
See application file for complete search history.

(56) References Cited

U.S. PATENT DOCUMENTS

| 2004/0107366 | A1* | 6/2004 | Balfanz et al. | 713/201 |
|---|---|---|---|---|
| 2007/0025371 | A1* | 2/2007 | Krantz et al. | 370/401 |
| 2007/0026856 | A1* | 2/2007 | Krantz et al. | 455/426.1 |
| 2009/0227282 | A1* | 9/2009 | Miyabayashi et al. | 455/552.1 |
| 2009/0296598 | A1* | 12/2009 | Harvey et al. | 370/252 |

OTHER PUBLICATIONS

European Patent Office, "Communication," Mar. 3, 2009, 9 pages.
"Introducing Wi-Fi Protected Setup™" Wi-Fi Alliance, [online] Jan. 3, 2007, retrieved from the Internet: http://www.wi-fi.org/files/KC_80_20070104_Introducing_Wi-Fi_Protected_SetUp.pdf, [retrieved on Feb. 18, 2009], XP002515938, pp. 1-22.

* cited by examiner

*Primary Examiner* — Clemence Han
(74) *Attorney, Agent, or Firm* — Hickman Palermo Truong & Becker LLP

(57) ABSTRACT

Techniques and systems for automatically configuring devices to interact with "legacy" wireless access points ("WAPs") are disclosed. According to one technique, a user programs a WPS-enabled WAP with the configuration information of a "legacy" WAP. This makes the WPS-enabled WAP "aware" of the "legacy" WAP. When any other user brings his device within discovery range of the WPS-enabled WAP, the WPS-enabled WAP sends, to that device, a list of the WAPs of which the WPS-enabled WAP is aware. The device's user selects one of the WAPs (e.g., a "legacy" WAP) from the list. The WPS-enabled WAP receives the user's selection and sends, to the device, the configuration information for the selected WAP. The user's device configures itself, using the configuration information, to interact with the selected WAP. Thereafter, the user's device can access a network through the selected WAP, even if the selected WAP is a "legacy" WAP.

20 Claims, 3 Drawing Sheets

LEGACY SUPPORT FOR WI-FI PROTECTED SETUP

FIELD OF THE INVENTION

The invention relates to wireless networks, and more specifically, to systems and techniques for automatically configuring older wireless routers.

BACKGROUND OF THE INVENTION

Wireless routers, wireless hubs, and other wireless access points allow computing devices to transmit data over a network without the use of any guided transmission medium such as a cable. Typically, these wireless access points operate in a manner that conforms to the well-known IEEE 802.11 "Wi-Fi" standards set. Wireless access points have become popular with home (as opposed to business) customers because, more and more often, home customers have more than one computer in their homes. Home customers like for each of their computers to be able to communicate with each other over a home network. Home customers use a home network to play multiplayer computer games, to transfer data from computer to computer, and to share an Internet connection, among other activities.

Often, home customers' homes do not come equipped with network jacks in each room. Prior to the emergence of wireless networking, if home customers wanted their computers to be connected to each other via a network, those customers often had to string long, unsightly, entangling network cables between the rooms in which the computers sat. Fortunately, wireless access points now allow home customers' computers to communicate with each other over short distances using unguided media such as electromagnetic waves as a transmission medium. Wireless access points receive wireless signals from one computer and forward those wireless signals to another computer, thereby enabling the computers to communicate with each other.

Network configuration has long been one of the more advanced, complicated, and difficult computer-related tasks that a home customer might take upon himself to perform. If any of the many parameters involved in a network configuration are not set correctly, then the home network will not work properly. The computers with which a wireless access point interacts often need to be configured with certain parameters (e.g., System Set Identifier (SSID), encryption (WEP) keys, etc.) before those computers can interact with that wireless access point in a home network. Because of the lack of simplicity and the technical nature of the configuration process, home customers often become frustrated when configuring computers to interact with wireless access points. Indeed, all too often, home customers simply give up and return wireless access points to the store from which those devices were purchased. This is not good for the business of the wireless access point provider.

In order to simplify the configuration process of home networks that employ wireless access points (among other reasons), the Wi-Fi Alliance launched the Wi-Fi Protected Setup ("WPS") standard in 2007. WPS is a standard that defines a protocol for easy and secure establishment of a wireless home network. The goal of WPS is to simplify the process of connecting any home device to a wireless network; originally, the standard was named "Wi-Fi Simple Config." Additionally, WPS is meant to assist home users in making those users' home networks secure from unauthorized access by others—some neighborhoods suffer from a problem in which the occupants of one home access the wireless network of another nearby home without authorization in order to use the Internet connection of the latter home without paying for such use. WPS is described in the WPS Specification Version 1.0h (December 2006), which is incorporated herein by reference. A wireless access point that conforms to the WPS standard is usually able to detect and configure, in a fairly automatic manner that requires minimal user interaction, devices that can be configured to interact that wireless access point. After such configuration, those devices are able to access a home network through the wireless access point.

The developers of WPS did not want wireless home networks to become vulnerable to "man-in-the-middle" attacks. A "man-in-the-middle" attack hypothetically occurs when an unauthorized device sits in between a wireless access point and a legitimate device that the wireless access point is configuring—the unauthorized device mounts the attack by (a) posing as the legitimate device to the wireless access point and (b) posing as the wireless access point to the legitimate device. Hypothetically, by intercepting, modifying, and forwarding communications between the wireless access point and the legitimate device, an unauthorized device might be able to obtain enough information to gain access to the home network.

In order to prevent such a security breach from occurring, WPS (in at least some implementations) requires that a user enter, into the device that is going to be configured by the wireless access point, a personal identification number (PIN) that the wireless access point recognizes. Normally, such a PIN is printed on a sticker that is attached to the wireless access point (e.g., on the underside thereof) by those who have manufactured the wireless access point. Under such circumstances, those who do not have physical access to the wireless access point cannot discover the PIN and cannot enter the PIN into their devices.

The PIN is used to authenticate the device in the following manner. During a pre-configuration device authentication process, the wireless access point encrypts a challenge using the PIN as an encryption key and sends the encrypted challenge to the device. If the correct PIN has been entered into the device, then the device can use the PIN to decrypt the challenge and reply to the wireless access point with an appropriate response. Upon receiving the appropriate response from the device, the wireless access point realizes that the device is authentic and proceeds to configure the device to enable the device to access the home network through the wireless access point.

Alternatively, if a device is unable to decrypt the challenge and provide an appropriate response to the wireless access point, then the wireless access point refrains from configuring that device to enable that device to access the home network through the wireless access point. A man-in-the-middle attacker, not having the wireless access point's PIN, cannot decrypt the wireless access point's PIN-encrypted challenge, and therefore cannot provide an appropriate response to that challenge. Because the PIN is never transmitted between the wireless access point and the device to be configured, a man-in-the-middle attacker has no opportunity to intercept the PIN.

Thus, WPS-enabled wireless access points aid users in setting up wireless home networks more easily and with greater security. However, there still exist many "legacy" wireless access points that are not WPS-enabled. Theoretically, existing "legacy" wireless access points that are not WPS-enabled could be discarded in favor of the newer WPS-enabled wireless access points, but this would be wasteful, since many such "legacy" wireless access points, though not WPS-enabled, are still otherwise technologically up-to-date and usable. Such "legacy" wireless access points might have been obtained at considerable expense to the owner. Yet, configuring devices to interact with "legacy" wireless access points that are not WPS-enabled remains a very daunting task for most home users.

Based on the foregoing, home users have a need to be able to configure their devices to interact with "legacy" wireless access points, which are not WPS-enabled, in a simpler manner that requires less technical knowledge from those home users.

SUMMARY OF THE INVENTION

Techniques and systems for automatically configuring devices to interact with "legacy" wireless access points, which are not WPS-enabled, are disclosed. In one embodiment of the invention, a technically sophisticated user (e.g., an information technology professional) manually programs a WPS-enabled wireless access point with the configuration information (e.g., System Set Identifier (SSID), encryption (WEP) keys, etc.) of one or more other "legacy" wireless access points. Beneficially, this programming only needs to be performed once. Thus, the WPS-enabled wireless access point becomes "aware" of the "legacy" wireless access points with which a user's device might potentially interact.

Thereafter, when any other technically unsophisticated user brings his WPS-capable (but as of yet unconfigured) device within discovery range of the WPS-enabled wireless access point, the WPS-enabled wireless access point sends, to that device, a list of the wireless access points (including the WPS-enabled wireless access point) of which the WPS-enabled wireless access point is aware. The device's user is invited to select one of the wireless access points from the list. The device sends the user's selection back to the WPS-enabled wireless access point. Upon receiving the user's selection, the WPS-enabled wireless access point sends, to the device, the previously programmed configuration information for the selected wireless access point—which may be a "legacy" wireless access point. In response to receiving, from the WPS-enabled wireless access point, the configuration information for a selected "legacy" wireless access point, the user's device configures itself, using the configuration information, to interact with the selected "legacy" wireless access point. Thereafter, the user's device can access a network through the selected "legacy" wireless access point.

Thus, beneficially, technically unsophisticated users are spared the burden of manually configuring their devices to interact with "legacy" wireless access points. After the WPS-enabled wireless access point has been programmed once with the configuration information for a "legacy" wireless access point, no user needs ever again to configure his device manually with the technically complicated parameters that his device needs in order to interact with that "legacy" wireless access point. Configuration information for a "legacy" wireless access point may be entered once, at a WPS-enabled device, and obtained thereafter by multiple devices that seek to interact with the "legacy" wireless access point. Using the techniques described herein, configuring a device to interact with a "legacy" wireless access point becomes as simple, for the user, as configuring that device to interact with a WPS-enabled wireless access point.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE INVENTION

Figure 1:
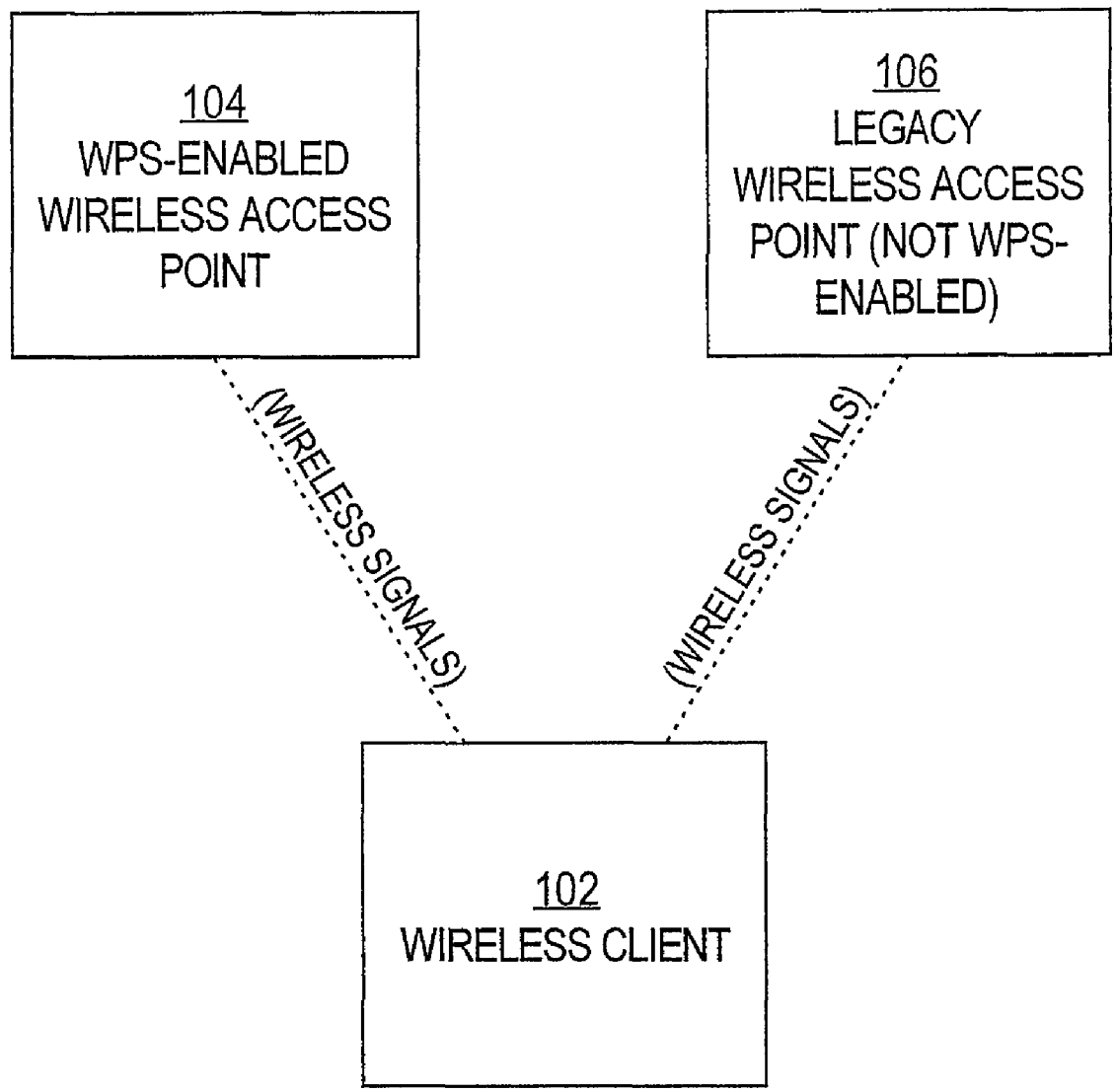
FIG. 1 is a block diagram that illustrates an example system for automatically configuring a device to interact with a "legacy" wireless access point using WPS, according to an embodiment of the invention.

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Overview

Techniques and systems for automatically configuring devices to interact with "legacy" wireless access points, which are not WPS-enabled, are disclosed. In one embodiment of the invention, a technically sophisticated user (e.g., an information technology professional) manually programs a WPS-enabled wireless access point with the configuration information (e.g., System Set Identifier (SSID), encryption (WEP) keys, etc.) of one or more other "legacy" wireless access points. Beneficially, this programming only needs to be performed once. Thus, the WPS-enabled wireless access point becomes "aware" of the "legacy" wireless access points with which a user's device might potentially interact.

Thereafter, when any other technically unsophisticated user brings his WPS-capable (but as of yet unconfigured) device within discovery range of the WPS-enabled wireless access point, the WPS-enabled wireless access point sends, to that device, a list of the wireless access points (including the WPS-enabled wireless access point) of which the WPS-enabled wireless access point is aware. The device's user is invited to select one of the wireless access points from the list. The device sends the user's selection back to the WPS-enabled wireless access point. Upon receiving the user's selection, the WPS-enabled wireless access point sends, to the device, the previously programmed configuration information for the selected wireless access point—which may be a "legacy" wireless access point. In response to receiving, from the WPS-enabled wireless access point, the configuration information for a selected "legacy" wireless access point, the user's device configures itself, using the configuration information, to interact with the selected "legacy" wireless access point. Thereafter, the user's device can access a network through the selected "legacy" wireless access point.

Thus, beneficially, technically unsophisticated users are spared the burden of manually configuring their devices to interact with "legacy" wireless access points. After the WPS-enabled wireless access point has been programmed once with the configuration information for a "legacy" wireless access point, no user needs ever again to configure his device manually with the technically complicated parameters that his device needs in order to interact with that "legacy" wireless access point. Configuration information for a "legacy" wireless access point may be entered once, at a WPS-enabled device, and obtained thereafter by multiple devices that seek to interact with the "legacy" wireless access point. Using the techniques described herein, configuring a device to interact with a "legacy" wireless access point becomes as simple, for the user, as configuring that device to interact with a WPS-enabled wireless access point.

Example Wireless Registration System

FIG. 1 is a block diagram that illustrates an example system for automatically configuring a device to interact with a "legacy" wireless access point using WPS, according to an embodiment of the invention. When a device is configured to interact with a wireless access point, that device is said to have "registered" with that wireless access point. The System illustrated comprises a client 102 that communicates wirelessly with a WPS-enabled wireless access point 104. Client 102 may communicate with wireless access points 104 and 106 according to the IEEE 802.11 standards. Client 102 may be a personal computer, a laptop computer, a cell phone, a personal digital assistant, a printer, a copy machine, a multi-function peripheral, a camera, a digital audio player, an appliance, a network hub, a network bridge, a network router, a mobile device, or any other electronic device that is capable of wireless communications.

The System illustrated also comprises a "legacy" wireless access point 106 with which client 102 can communicate wirelessly. Unlike wireless access point 104, "legacy" wireless access point 106 is not WPS-enabled. For example, "legacy" wireless access point 104 might be a wireless access point that was manufactured and/or sold before WPS became available. Wireless access points 104 and 106 may be network hubs, network bridges, network routers, or any other electronic devices that facilitate network communications between devices and networks. In one embodiment of the invention, wireless access points 104 and 106 are connected (either wirelessly or via wires) to one or more networks, such as LANs, WANs, and/or the Internet. Wireless access points 104 and 106 may be connected to the same network and/or wireless access points 104 and 106 may be connected to different networks.

An example technique for automatically configuring client 102 to interact with "legacy" wireless access point 106 using WPS is discussed below.

Figure 2:
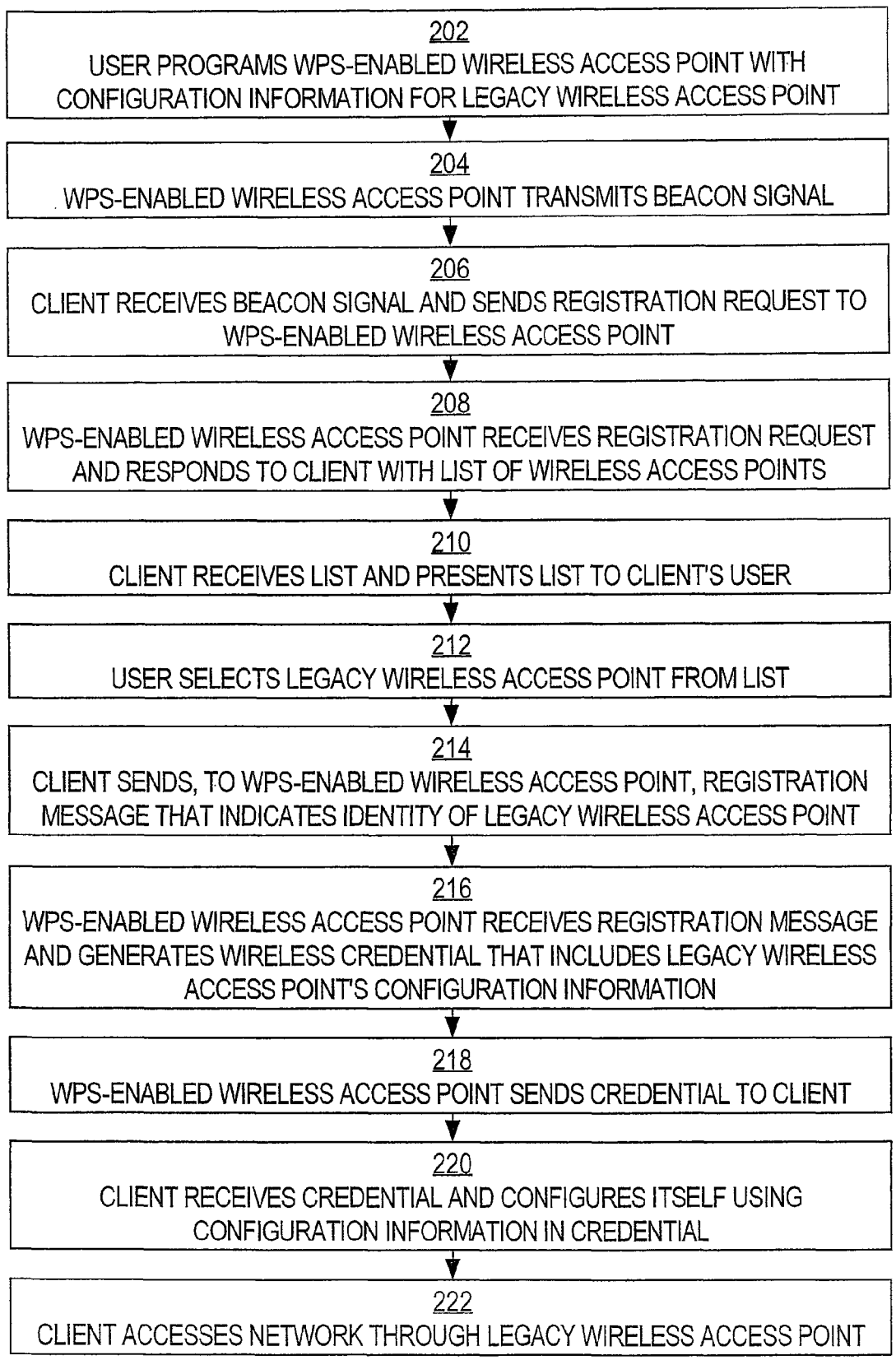
FIG. 2 is a flow diagram that illustrates an example technique for automatically configuring a device to interact with a "legacy" wireless access point using WPS, according to an embodiment of the invention.

Automatically Configuring a Device to Interact with a "Legacy" Wireless Access Point Using WPS FIG. 2 is a flow diagram that illustrates an example technique for automatically configuring a device to interact with a "legacy" wireless access point using WPS, according to an embodiment of the invention. Alternative embodiments may involve more, fewer, or different steps than those illustrated in FIG. 2.

In block 202, a user programs WPS-enabled wireless access point 104 with configuration information for "legacy" wireless access point 106. The configuration information may include, for example, an IP address of "legacy" wireless access point 106, a MAC address of "legacy" wireless access point 106, and/or any other information about "legacy" wireless access point 106. In one embodiment of the invention, the configuration information is the same configuration information that a user of client 102 would ordinarily have entered into client 102 manually (a difficult process for most technically unsophisticated users) in order to configure client 102 to be able to access a network through "legacy" wireless access point 106. In one embodiment of the invention, the configuration information is of the same kind that WPS-enabled wireless access point 104 would ordinarily send to client 102 in order to configure client 102 to be able to access a network through WPS-enabled wireless access point 104, except that the configuration information pertains to "legacy" wireless access point 106 rather than WPS-enabled wireless access point 104. In one embodiment of the invention, WPS-enabled wireless access point 104 stores the configuration information in a non-volatile memory of WPS-enabled wireless access point 104.

In block 204, WPS-enabled wireless access point 104 transmits a beacon signal wirelessly to any device that is capable of receiving the beacon signal and in the signal range. The beacon signal is a way to alert WPS-capable devices that those devices are within range of a WPS-enabled wireless access point. By transmitting the beacon signal periodically, WPS-enabled wireless access point 104 attempts to discover, automatically, WPS-capable devices that have not yet been configured to access WPS-enabled wireless access point 104, so that WPS-enabled wireless access point 104 can configure those devices. In one embodiment of the invention, both WPS-enabled wireless access point 104 and client 102 have had their configuration methods set to the "use profile" method, as is discussed in the WPS standard.

In block 206, client 102 receives the beacon signal and sends a registration request to WPS-enabled wireless access point 104.

In block 208, WPS-enabled wireless access point 104 receives the registration request and responds with a list of identities of wireless access points of which WPS-enabled wireless access point 104 is aware. Because a user programmed WPS-enabled wireless access point 104 with configuration information for "legacy" wireless access point 106 in step 202, WPS-enabled wireless access point 104 is aware of "legacy" wireless access point 106. Consequently, the identity of "legacy" wireless access point 106 is in the list that WPS-enabled wireless access point 104 sends to client 102. The identity of WPS-enabled wireless access point 104 is also in the list.

In block 210, client 102 receives the list of wireless access points and presents the list to a user of client 102. In block 212, the user selects "legacy" wireless access point 106 from the list. In block 214, client 102 sends a WPS registration message to WPS-enabled wireless access point 104. The WPS registration message indicates the identity of user-selected "legacy" wireless access point 106. In one embodiment of the invention, the WPS registration message indicates that the configuration method is "use profile." In one embodiment of the invention, the WPS registration message indicates a profile identity of "legacy" wireless access point 106 in a vendor extension attribute of the WPS registration message.

In block 216, WPS-enabled wireless access point 104 receives the WPS registration message from client 102 and generates a wireless credential in response. In one embodiment of the invention, the wireless credential includes the configuration information for the wireless access point whose profile identity was indicated in the WPS registration message—in this case, "legacy" wireless access point 106. Thus, in one embodiment of the invention, WPS-enabled wireless access point 104 generates a wireless credential that contains the configuration information for "legacy" wireless access point 106—the same registration information that a user programmed into WPS-enabled wireless access point 104 in step 202.

In block 218, WPS-enabled wireless access point 104 sends the wireless credential to client 102. In block 220, client 102 receives the wireless credential and configures itself, using the configuration information contained in the wireless credential, to be able to access a network through "legacy"

wireless access point 106. In one embodiment of the invention, client 102 configures itself in the same manner that client 102 would have configured itself using configuration information pertaining to WPS-enabled wireless access point 104, according to the WPS standard, except that the configuration information pertains to "legacy" wireless access point 106 instead of WPS-enabled wireless access point 104.

After configuring itself in step 220, client 102 is capable of accessing a network through "legacy" wireless access point 106. Therefore, in step 222, client 102 accesses, through "legacy" wireless access point 106, a network to which "legacy" wireless access point 106 is connected (either wirelessly or via wires). The above technique can be performed completely without ever requiring the user of client 102 to enter, into client 102, configuration information for "legacy" wireless access point 106; WPS-enabled wireless access point 104 supplies such configuration information to client 102 instead. This makes the configuration process much easier for the user of client 102, who may be a different user than the user who programmed WPS-enabled wireless access point 104 with the configuration information for "legacy" wireless access point 106.

Implementation Mechanisms

Figure 3:
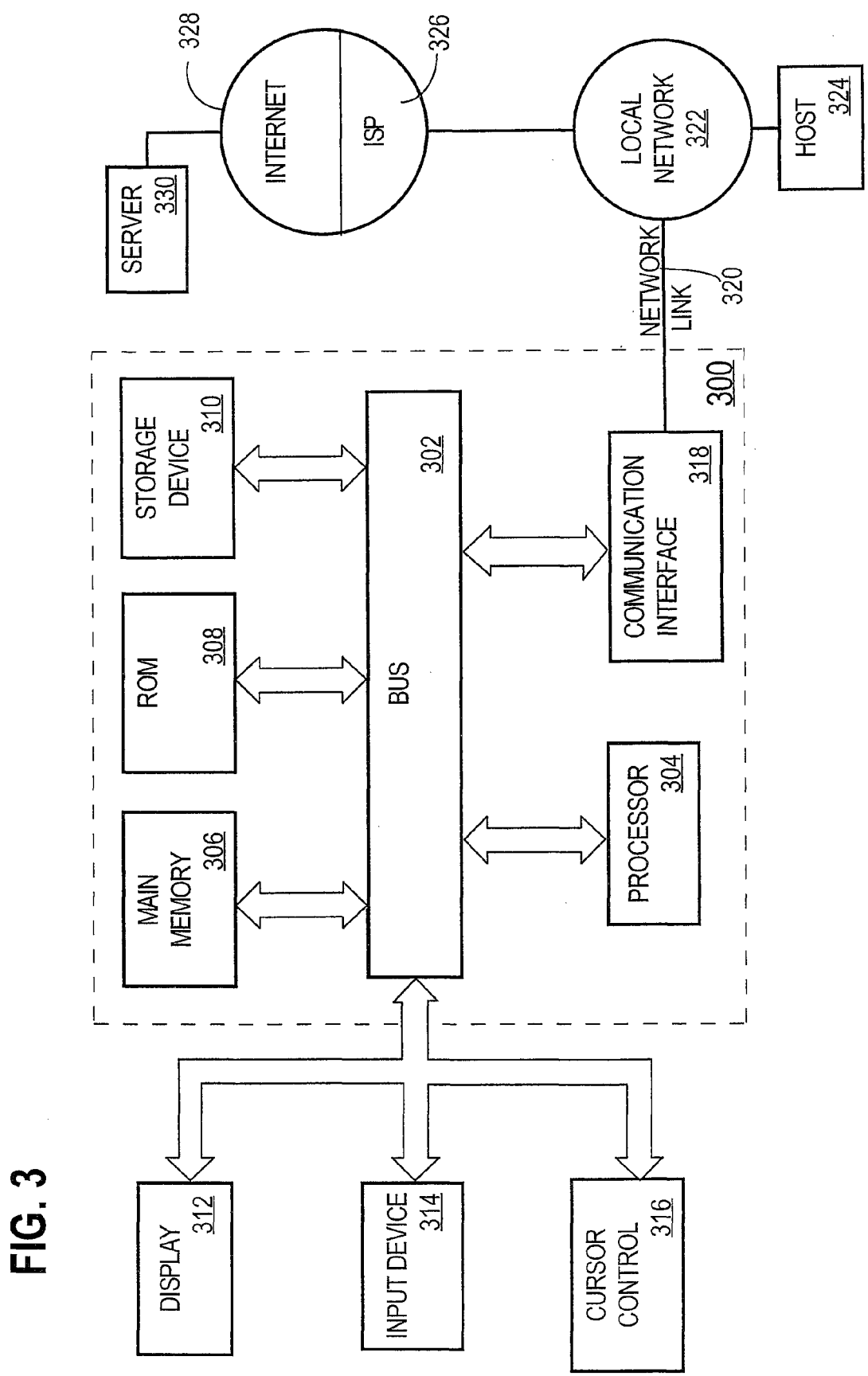
FIG. 3 is a block diagram that depicts a device upon which an embodiment of the invention may be implemented.

The approach described herein may be implemented on any type of computing platform or architecture. For purposes of explanation, FIG. 3 is a block diagram that depicts an example computer system 300 upon which embodiments of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media and volatile media. Non-volatile media includes, for example, optical or magnetic disks, such as storage device 310. Volatile media includes dynamic memory, such as main memory 306.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for automatically enabling a client to interact with a first wireless access point that is not Wireless Provisioning Services (WPS)-enabled, the method comprising:
    storing, at a second wireless access point that is both WPS-enabled and separate from the first wireless access point, configuration information pertaining to the first wireless access point; and
    sending the configuration information from the second wireless access point to the client in a message that conforms to the WPS standard;
    wherein, upon receiving the configuration information, the client configures itself using the configuration information to access a network through the first wireless access point rather than the second wireless access point.

2. The method of claim 1, wherein sending the configuration information comprises sending a wireless credential that contains the configuration information.

3. The method of claim 1, wherein the configuration information comprises a Wired Equivalent Privacy (WEP) encryption key used by the first wireless access point.

4. The method of claim 1, further comprising:
    sending, from the second wireless access point to the client, a list of wireless access points; and
    receiving, at the second wireless access point, an identity of a wireless access point that was selected from the list by a user of the client.

5. The method of claim 1, further comprising:
    generating, at the second wireless access point, a credential that contains the configuration information;
    wherein sending the configuration information comprises sending the credential to the client.

6. The method of claim 1, further comprising:
    receiving, at the second wireless access point, from the client, a Wireless Provisioning Services (WPS) registration message that indicates, in a vendor extension attribute of the WPS registration message, a profile identity of the first wireless access point.

7. The method of claim 1, wherein the client's receipt of the configuration information allows the client to configure itself to interact with the first wireless access point without requiring a user of the client to enter the configuration information into the client.

8. A non-transitory machine-readable medium storing one or more sequences of instructions, wherein execution of the one or more sequences of instructions by one or more processors causes the one or more processors to perform the steps of:
    storing, at a second wireless access point that is Wireless Provisioning Services (WPS)-enabled, configuration information pertaining to a first wireless access point that is not WPS-enabled; and
    sending the configuration information from the second wireless access point to a client in a message that conforms to the WPS standard;
    wherein the second wireless access point is separate from the first wireless access point;
    wherein, upon receiving the configuration information, the client configures itself using the configuration information to access a network through the first wireless access point rather than the second wireless access point.

9. The non-transitory machine-readable medium of claim 8, wherein sending the configuration information comprises sending a wireless credential that contains the configuration information.

10. The non-transitory machine-readable medium of claim 8, wherein the configuration information comprises a Wired Equivalent Privacy (WEP) encryption key used by the first wireless access point.

11. The non-transitory machine-readable medium of claim 8, wherein the steps further comprise:
    sending, from the second wireless access point to the client, a list of wireless access points; and
    receiving, at the second wireless access point, an identity of a wireless access point that was selected from the list by a user of the client.

12. The non-transitory machine-readable medium of claim 8, wherein the steps further comprise:
    generating, at the second wireless access point, a credential that contains the configuration information;
    wherein sending the configuration information comprises sending the credential to the client.

13. The non-transitory machine-readable medium of claim 8, wherein the steps further comprise:
    receiving, at the second wireless access point, from the client, a Wireless Provisioning Services (WPS) registration message that indicates, in a vendor extension attribute of the WPS registration message, a profile identity of the first wireless access point.

14. The non-transitory machine-readable medium of claim 8, wherein the client's receipt of the configuration information allows the client to configure itself to interact with the first wireless access point without requiring a user of the client to enter the configuration information into the client.

15. A Wireless Provisioning Services (WPS)-enabled wireless access point that is configured to:
    store configuration information pertaining to a legacy wireless access point that is not WPS-enabled and that is separate from the WPS-enabled wireless access point; and
    send the configuration information to a client in a message that conforms to the WPS standard;
    wherein, upon receiving the configuration information, the client configures itself using the configuration information to access a network through the legacy wireless access point rather than the WPS-enabled wireless access point.

16. The WPS-enabled wireless access point of claim 15, wherein the WPS-enabled wireless access point is configured to send the configuration information in a wireless credential that contains the configuration information.

17. The WPS-enabled wireless access point of claim 15, wherein the WPS-enabled wireless access point is configured to:
   send a list of wireless access points to the client; and
   receive an identity of a wireless access point that was selected from the list by a user of the client.

18. The WPS-enabled wireless access point of claim 15, wherein the WPS-enabled wireless access point is configured to:
   generate a credential that contains the configuration information; and
   send the credential to the client.

19. The Wireless Provisioning Services (WPS)-enabled wireless access point of claim 15, wherein the WPS-enabled wireless access point is configured to receive, from the client, a Wireless Provisioning Services (WPS) registration message that indicates, in a vendor extension attribute of the WPS registration message, a profile identity of the legacy wireless access point.

20. The Wireless Provisioning Services (WPS)-enabled wireless access point of claim 15, wherein the configuration information comprises a Wired Equivalent Privacy (WEP) encryption key used by the legacy wireless access point.

* * * * *